United States Patent [19]

Simonaire

[11] 4,126,862
[45] Nov. 21, 1978

[54] COUNTERMEASURE FOR LORO RADAR

[75] Inventor: Fred M. Simonaire, Baltimore, Md.

[73] Assignee: The United States of America as represented by the Secretary of the Air Force, Washington, D.C.

[21] Appl. No.: 725,583

[22] Filed: Apr. 23, 1968

Related U.S. Application Data

[63] Continuation-in-part of Ser. No. 489,101, Sep. 20, 1965, abandoned.

[51] Int. Cl.² ............................................. G01S 7/38
[52] U.S. Cl. .................................................. 343/18 E
[58] Field of Search ................................ 343/18, 18 E

[56] References Cited

U.S. PATENT DOCUMENTS

| | | |
|---|---|---|
| 2,531,398 | 11/1950 | Cawein ..................... 343/18 E X |
| 2,567,261 | 9/1951 | Williams .................... 343/18 E X |
| 2,653,222 | 9/1953 | Williams et al. ............ 343/18 E X |
| 3,113,268 | 12/1963 | Horak ....................... 343/18 E X |

Primary Examiner—T.H. Tubbesing
Attorney, Agent, or Firm—Joseph E. Rusz; James S. Shannon

[57] ABSTRACT

A countermeasure for LORO (lobe-on-receive-only) tracking radars comprising a transmitter and a receiver which controls the transmitter. The transmitter radiates pulses on the radar's frequency at a repetition rate that repeatedly sweeps over a range selected to include the unknown lobing frequency of the radar, the sweeps being alternately slow and fast. The receiver circuit receives the tracking radar signal and operates upon a fall in its intensity to halt the pulse frequency sweep and cause it to reverse at a slow rate.

3 Claims, 3 Drawing Figures

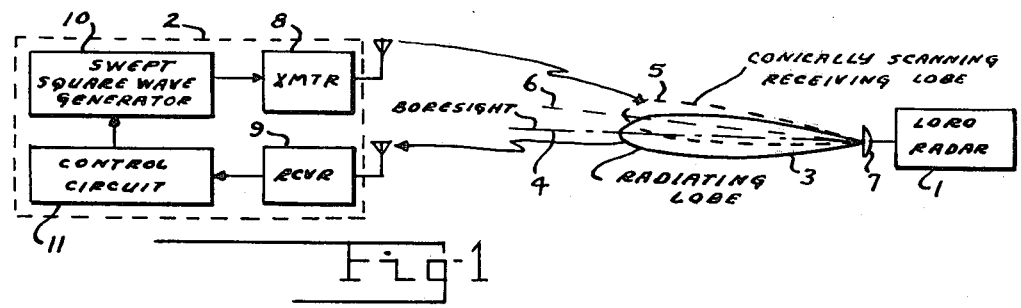
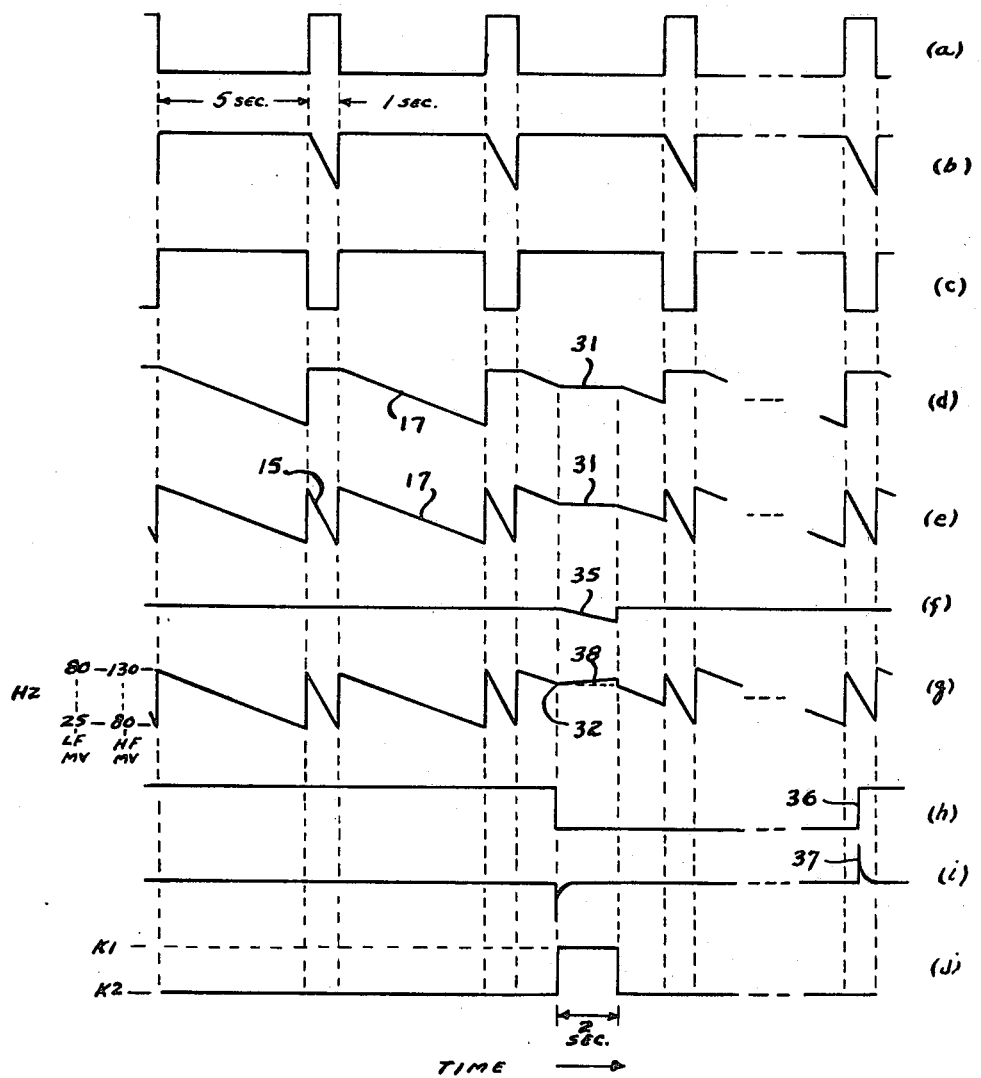

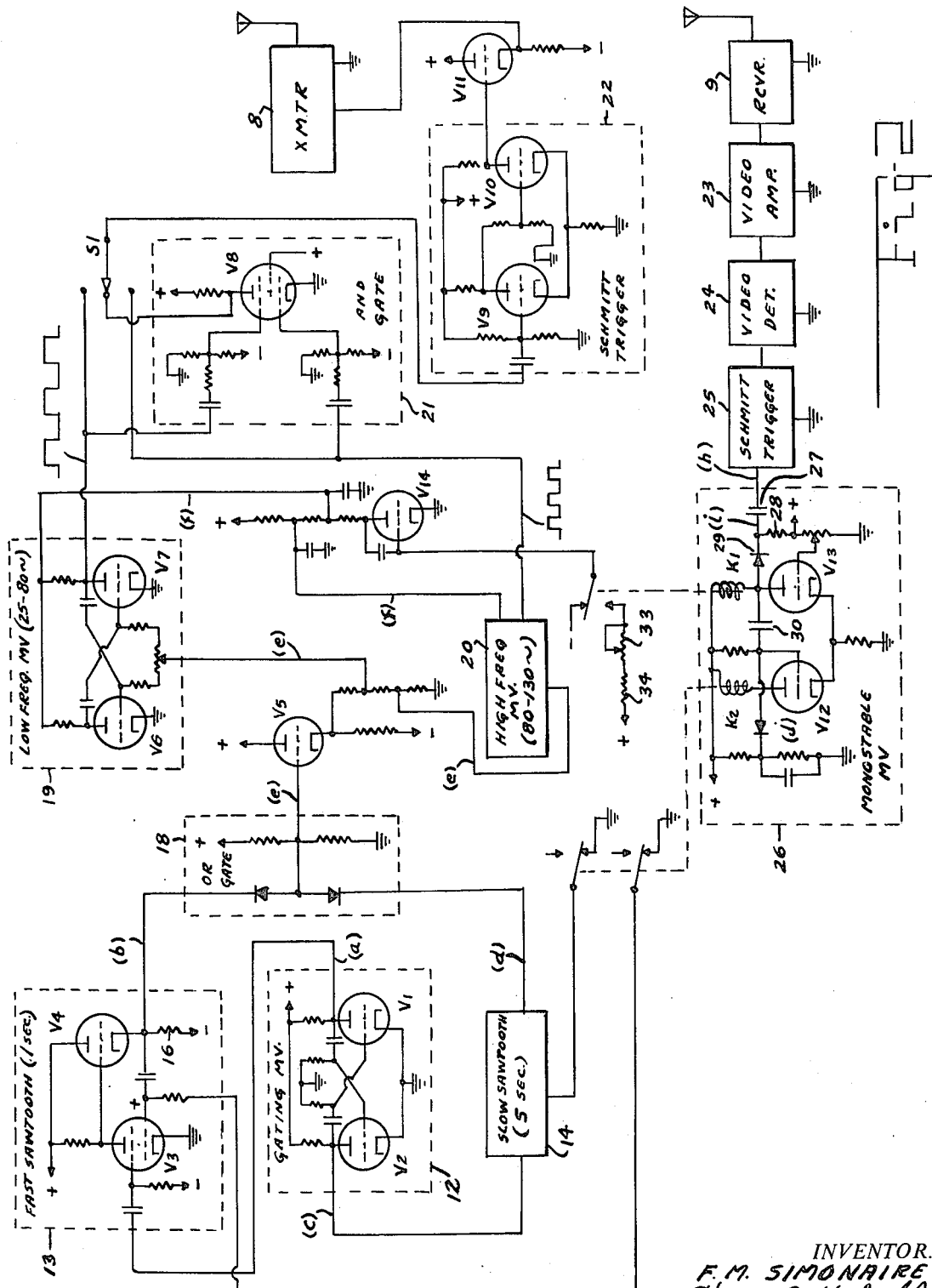

COUNTERMEASURE FOR LORO RADAR

CROSS-REFERENCES TO RELATED APPLICATIONS

This application is a continuation-in-part of my application Ser. No. 489,101, filed Sept. 20, 1965, now abandoned.

BACKGROUND OF THE INVENTION

The invention relates to radar countermeasures particularly for radars that lobe, i.e. employ their tracking scan, on receive only.

Tracking radars usually employ a conical scan of the antenna lobe in which the axis of symmetry of the lobe makes a slight angle to the antenna boresight and rotates at a constant rate thereabout generating the surface of a cone. If there is an angular error between the antenna boresight and the target, the return signal has an amplitude modulation at the rotational frequency of the lobe the amplitude of which represents the magnitude of the error and the phase of which relative to a predefined reference phase represents the direction of the error. The antenna aiming system of the tracking radar uses this information to reduce the angular error between boresight and target to zero.

In order to make countermeasures more difficult and to reduce the effect of spurious signals in general on the antenna aiming system of the radar, the signal acceptance of the aiming circuits is limited to a very narrow band of frequencies centered on the lobing frequency, i.e. the rotational frequency of the conical scan. Consequently, the signal radiated by a countermeasure device for the purpose of achieving angle deception of the radar must contain the lobing frequency in order to influence the antenna aiming. Where the radar both transmits and receives on the conically scanning lobe the lobing frequency can be determined at the target from the amplitude modulation of the incident radiation. In a LORO radar, however, only the receiving lobe scans, the transmitting lobe remaining fixed and symmetrical to the antenna boresight at all times. This type radar therefore transmits no information about its lobing frequency which creates the problem for the countermeasure device of determining this frequency and radiating a signal containing energy at or very near this frequency for a sufficient interval of time to break the tracking lock of the radar.

SUMMARY OF THE INVENTION

The countermeasure device described in this application radiates radio frequency energy amplitude modulated at a frequency that sweeps continuously at alternately fast and slow rates over a range of frequencies sufficiently wide to include all of the possible radar lobing frequencies. When this signal sweeps past the radar lobing frequency, sufficient energy enters the antenna aiming circuits to produce a slight angular displacement or jog of the antenna boresight. Due to the directivity of the energy radiated by the radar, this displacement causes a drop in intensity of the radiation illuminating the target to which the countermeasure device responds by halting the modulating frequency sweep and causing it to reverse at a very low rate for a predetermined interval. During this interval the frequency of the modulation is close enough to the radar lobing frequency to be accepted by the antenna aiming circuits and cause the antenna boresight to be pulled off the target far enough to break the tracking lock and institute the search mode of operation of the radar.

BRIEF DESCRIPTION OF THE DRAWING

FIG. 1 illustrates the general arrangement of the countermeasure device and the antenna patterns of the radar;

FIG. 2 is a schematic diagram of the countermeasure device in accordance with the invention; and FIG. 3 shows the waveforms present in FIG. 2.

DESCRIPTION OF THE PREFERRED EMBODIMENT

Referring to FIG. 1, the radar 1 against which the device 2 is intended to act as a countermeasure radiates energy directionally in a pattern represented by lobe 3 which is at all times symmetrical to the antenna boresight 4. On the other hand, reception of energy from the target, at which countermeasure device 2 is located, is by way of a directional lobe 5 symmetrical to an axis 6 which makes a small angle with the boresight 4. Receiving lobe 5 rotates about boresight 4 at a constant angular velocity so that axis 6 generates the surface of a cone, this action being referred to in the art as a conical scan and the reciprocal of the rotational period being referred to as the scanning or lobing frequency. Usually the radar antenna is constructed with a single reflector 7 having two feeds, one a fixed feed for producing the fixed transmitting lobe 3 and the other a feed designed to produce the conically scanning receiving lobe 5; however, separate transmit and receive antennas with parallel boresights may be used. When the boresight 4 intersects the target the received signal is constant throughout the rotational cycle of lobe 5. On the other hand, when there is an angular tracking error between the boresight and the target there is an amplitude modulation of the received signal at the lobing frequency the magnitude of which represents the magnitude of the angular error and the phase of which, relative to a reference phase, indicates the direction of the error. This modulation is the error signal to which the antenna aiming circuits of the radar respond to keep the boresight of the antenna on the target.

The countermeasure device 2 in FIG. 1 comprises as basic elements a transmitter 8 capable of radiating radio frequency energy on the radar frequency, a receiver 9 capable of receiving the radio frequency energy radiated by the radar, a swept square wave generator 10 which automatically sweeps at alternately slow and fast rates over the range of possible radar lobing frequencies and amplitude modulates the transmitter 8, and a control circuit 11 which receives the output of receiver 9 and responds to a fall in the receiver output below a predetermined level to halt the sweep of generator 10 and cause it to reverse at a very low rate for a fixed interval of time. The operation of device 2 as a LORO radar countermeasure is as follows:

When the frequency of the frequency swept modulation of transmitter 8 coincides with the lobing frequency of the radar the modulation is accepted as an error signal by the antenna aiming circuits of the radar which react to produce a sudden change or jog in the direction of boresight 4 away from the target and toward a false target at a position indicated by the amplitude and phase of the accepted countermeasure signal. Due to the directivity of the radar transmitting lobe 3, this has the effect of reducing the radar signal strength at the target. The resulting drop in the output of receiver 9 causes control circuit 11 to halt the sweep of the modulating frequency and cause it to reverse at a low rate for a fixed interval, as explained above. This has the effect of keeping the modulating frequency within the acceptance band of the radar antenna aiming circuits long enough to pull the antenna boresight off the target sufficiently to break the tracking lock on the target and cause the radar to switch to its search mode.

The details of swept square wave generator 10 and control circuit 11 are shown in FIG. 2. An asymmetrical free-running multivibrator 12 produces, at the anodes of $V_1$ and $V_2$, rectangular waveforms (a) and (c) of FIG. 3 which are used to gate fast sawtooth generator 13 and similar slow sawtooth generator 14, respectively. In the specific embodiment shown, the duration of the positive-going pulse at the anode of $V_1$ is 1 second and the duration of the positive-going pulse at the anode of $V_2$ is 5 seconds, as seen in FIG. 3. Sawtooth generator 13 is a known type of Miller integrator employing a pentode $V_3$ with suppressor grid gating and a cathode follower $V_4$, the essential features of which are described, for example, in connection with FIG. 7.28, page 282, of Volume 19, Waveforms, of the Radiation Laboratory Series, First Edition, 1949, McGraw-Hill Book Company. Pentode $V_3$ is normally cut off by a negative potential applied to its suppressor grid. Application of waveform (a) to the suppressor causes the tube to become operative during the 1 second positive-going portions of the wave and ramp 15 of waveform (b) to be generated across resistor 16. Except for the parameters controlling the slope of the ramp, slow sawtooth generator 14 is identical to fast sawtooth generator 13 and operates during the 5 second positive-going portion of waveform (c) to produce at its output the ramp 17 of waveform (d). The waveforms (b) and (d) are combined by diode OR gate 18 to produce on the grid and at the two outputs of cathode follower $V_5$ voltages which may be represented by waveform (e) of FIG. 3.

The swept frequency modulating signals for transmitter 8 are generated by low frequency square wave generator 19 and high frequency square wave generator 20 under the control of the alternate slow and fast ramps of waveform (e). These generators are symmetrical free-running multivibrators and, except for the parameters determining their frequency ranges, are identical. The frequency of a multivibrator of this type can be controlled by varying the control grid voltages of the tubes, a lowering of the voltage producing a decrease in frequency. Thus, the downwardly sloping voltage ramps 15 and 17 of waveform (e) are applied to the grids of $V_6$ and $V_7$ and cause the frequency of multivibrator 19 to vary between a maximum of 80 Hz and a minimum of 25 Hz at alternate fast and slow rates. Similarly, at the same time, waveform (e) applied to high frequency multivibrator 20 causes the frequency of this multivibrator to vary between a maximum of 130 Hz and a minimum of 80 Hz at alternate fast and slow rates. The frequency variations of the two multivibrators are illustrated by waveform (g) of FIG. 3.

With S1 in its central position as shown, the square wave outputs of multivibrators 19 and 20 are combined in coincidence amplifier 21 and applied to a Schmitt trigger squaring circuit 22. Coincidence circuit 21 acts as an AND gate, i.e. an output is produced only when both inputs are present, and its output contains all of the fundamental frequencies produced by multivibrators 19 and 20. As well known in the art, a Schmitt trigger is a special type of bistable multivibrator which is in one stable state when the input is above a fixed upper value and in the other stable state when the input is below another fixed lower value. Thus, when the input on the grid of $V_9$ is above the fixed upper value $V_9$ is conductive and $V_{10}$ cut off, producing the higher of two output voltages; and when below the fixed lower value $V_9$ is cut off and $V_{10}$ is conductive, producing the lower of the two output voltages. The resulting rectangular output pulses are applied through cathode follower $V_{11}$ to transmitter 8 as modulating signals.

The control circuit 11 of FIG. 1 comprises in FIG. 2 video amplifier 23, video detector 24, Schmitt trigger 25, monostable multivibrator 26, relays $K_1$ and $K_2$ and the voltage ramp circuit comprising Miller integrator $V_{14}$. The video output of receiver 9 is amplified by amplifier 23 and rectified by detector 24 which contains the necessary low pass filtering to produce an output voltage proportional to the average value of the receiver video output. When the target is being tracked by the radar the output of detector 24 is relatively high and above the upper threshold of Schmitt trigger 25, which is similar to Schmitt trigger 22, with the result that this circuit has its higher output voltage as represented by the upper level of waveform (h) in FIG. 3. Also, monostable multivibrator 26 is in its stable state in which $V_{12}$ is conductive and $V_{13}$ cut off. In this state relay $K_2$ is energized and sawtooth generators 13 and 14 are operative by virtue of the connections to ground established by the contacts of this relay. Also, in the stable state, relay $K_1$ is deenergized and Miller integrator tube $V_{14}$, explained later, is inoperative due to the negative potential applied to its grid through the back contacts of this relay.

When the output of receiver 9 drops due to a jog of the radar antenna as explained above, the output of video detector 24 drops below the lower threshold of Schmitt trigger 25 causing its output to abruptly fall to its lower value as represented by the lower level of waveform (h). Due to the differentiating action of capacitor 27 and resistor 28, the negative-going voltage produces a sharp negative pulse, as seen in waveform (i), which is applied through diode 29 and capacitor 30 to the grid of $V_{12}$ cutting this tube off and switching the the circuit to its unstable state in which $V_{13}$ is conductive and $V_{12}$ nonconductive. In the embodiment shown, the circuit 26 is designed to remain in its unstable state for approximately 2 seconds after which it reverts to its stable state. This is illustrated by waveform (j) which represents the anode voltage on $V_{12}$.

When the switch to the unstable state occurs, $K_1$ is energized and $K_2$ deenergized. Deenergization of $K_2$ breaks the ground connections for sawtooth generators 13 and 14 which freezes the output ramp voltage of the generator operative at the time at its instantaneous value. In the situation represented by the waveforms of FIG. 3, sawtooth circuit 14 is operative at the time circuit 26 is switched and its ramp voltage is frozen at the level represented by portion 31 of waveform (d). Consequently, the ramp voltage applied to control the frequencies of multivibrators 19 and 20 is also frozen at the level represented by portion 31 of waveform (e), and the frequency sweeps of these multivibrators are halted at the frequencies represented by point 32 of waveform (g). At the same time energization of $K_1$ renders tube $V_{14}$ operative by connecting its control grid through the front contacts of $K_1$ and resistors 33 and 34 to a point of positive potential. This causes the Miller integrating circuit of which $V_{14}$ is a part to generate a negative-going ramp voltage, represented by portion 35 of waveform (*f*), which is applied to the anodes of the tubes in multivibrators 19 and 20. Since decreasing the anode voltage increases the multivibrator frequency, the frequency sweeps of multivibrators 19 and 20 are reversed and back up slowly during the 2 second interval, as illustrated by portion 38 of waveform (*g*). The rate of backing is made very low in order to keep the modulation frequency within the acceptance band of the radar antenna aiming circuits as long as possible.

At the end of the 2 second interval, monostable multivibrator 26 automatically reverts to its stable state energizing $K_2$ and deenergizing $K_1$. The energization of $K_2$ re-establishes the ground connections for circuits 13 and 14 causing these ramp generating circuits to resume operation from the point in their cycle at which the 2 second interval began, as illustrated by waveform (*e*). As a result, the frequency sweeps of circuits 19 and 20 are resumed from the point in their cycle at which the 2 second interval began, as illustrated by waveform (*g*). The deenergization of $K_1$ again cuts off $V_{14}$ and restores the anode voltages of the tubes in circuits 19 and 20 to the values they had at the start of the 2 second interval, as illustrated by waveform (*f*).

Should the target again be acquired and tracked by the same or another radar the resulting increase in receiver 9 output would switch Schmitt trigger 25 to its higher output state as shown by portion 36 of waveform (*h*). However the resulting pulse applied to the grid of $V_{12}$ of monostable circuit 26 is of the wrong polarity to trigger this circuit, as illustrated by pulse 37 of waveform (*i*). Consequently, circuit 26 is not triggered until the receiver output drops, as explained above.

Where the frequency range provided by either multivibrator 19 or multivibrator 20 will suffice, either may be employed alone and AND gate 21 bypassed by placing S1 in either its upper or its lower position.

The specific embodiment shown in the drawing and described above is intended to be illustrative only. Any design of the system elements may be used provided they are capable of performing the functions described.

I claim:

1. A countermeasure device for a tracking radar of the lobe-on-receive-only type comprising: means for radiating energy on the radar's frequency, means for amplitude modulating said radiated energy at a frequency that repeatedly sweeps at alternate slow and fast rates over a range of frequencies including the unknown lobing frequency of the radar, means for receiving energy radiated by said radar, and control means responsive to an abrupt decrease in the intensity of the received energy to arrest the modulating frequency sweep and institute for a predetermined interval a reverse sweep of the modulating frequency at a rate slower than said slow rate.

2. Apparatus as claimed in claim 1 in which said modulating means comprises first and second ramp voltage generators operating alternately to generate ramp voltages of the same amplitude but different slopes; a pair of oscillators voltage tunable over contiguous frequency ranges which together include the unknown radar lobing frequency; means for applying said ramp voltages simultaneously to said oscillators as tuning voltages for simultaneously sweeping said oscillators over their respective frequency ranges; and means for applying the outputs of said oscillators to said radiating means for amplitude modulating the radiated energy.

3. Apparatus as claimed in claim 2 in which said control means comprises a third ramp generator for producing a ramp voltage of less slope than the ramp of lesser slope produced by the first and second ramp generators; a monostable multivibrator coupled to said ramp generators and acting in its stable state to render the first and second ramp generators operative and the third ramp generator inoperative, and acting in its unstable state to render the third ramp generator operative and to hold the ramp voltage of that one of the first and second ramp generators operative at the instant of switching from the stable to the unstable state at its instantaneous value; means for applying the ramp voltage produced by said third ramp generator to said oscillators as a tuning voltage for varying the frequency of said oscillators in the opposite sense to the variation produced by the ramp voltages of said first and second ramp generators; and means coupled to the output of said receiving means and to said monostable multivibrator for switching said multivibrator from its stable state to its unstable state when the receiver output falls below a predetermined value.

* * * * *